W. M. MYERS.
SAFETY VALVE MECHANISM FOR PNEUMATIC TIRES.
APPLICATION FILED JULY 20, 1914.
1,136,901.
Patented Apr. 20, 1915.
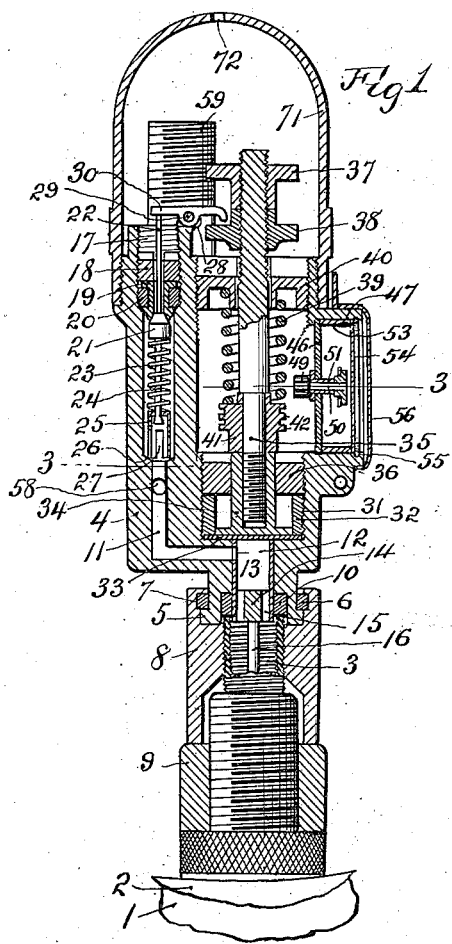
WITNESSES:
R. Hamilton
E. B. House.
William M. Myers INVENTOR.
BY
Warren D. House
His ATTORNEY.

UNITED STATES PATENT OFFICE.

WILLIAM M. MYERS, OF ST. JOSEPH, MISSOURI.

SAFETY-VALVE MECHANISM FOR PNEUMATIC TIRES.

1,136,901. Specification of Letters Patent. Patented Apr. 20, 1915.

Application filed July 20, 1914. Serial No. 851,878.

*To all whom it may concern:*

Be it known that I, WILLIAM M. MYERS, a citizen of the United States, residing at St. Joseph, in the county of Buchanan and State of Missouri, have invented certain new and useful Improvements in Safety-Valve Mechanisms for Pneumatic Tires, of which the following is a specification.

My invention relates to improvements in safety valve mechanisms for pneumatic tires.

The object of my invention is to provide novel means by which when the pressure in a pneumatic tire reaches a pre-determined amount, some of the air will be discharged to the atmosphere so as to prevent damage to the tire.

My invention provides further novel safety valve mechanism which permits of the tire being pumped up without disturbing the operation of the safety valve mechanism, thereby eliminating danger of bursting the tire during the filling operation.

My invention provides still further novel means of adjustment by which the mechanism may be set to operate at different pressures.

My invention provides still further novel indicating mechanism by which the tire pressure may be ascertained at a glance.

My invention further provides a novel safety valve mechanism adapted to be quickly attached to or detached from the usual filling tubes now in use on pneumatic tires.

Other features of my invention are hereinafter fully described and claimed.

In the accompanying drawings which illustrate the preferred embodiment of my invention, Figure 1 is an enlarged vertical sectional view of my improved safety valve mechanism shown mounted on an ordinary tire filling tube, shown partly in elevation and partly in vertical section. Fig. 2 is a reduced elevation view of my improved safety valve mechanism, the closure for the pressure indicator being shown in the open position. Fig. 3 is a cross section on the broken line 3—3 of Fig. 1, the coil spring on the plunger being omitted. Fig. 4 is a fragmental vertical sectional view on the plane of the line 4—4 of Fig. 3. Fig. 5 is a view partly in side elevation, partly in vertical section and partly broken away, of my improved valve mechanism, the cap being removed.

Similar reference characters designates similar parts in the different views.

1 designates a portion of an ordinary inflatable tire, and 2 a portion of the rim on which the tire is mounted.

3 designates the ordinary filling tube attached to the tire 1 and having an internally and an externally screw-threaded upper end.

My improved valve mechanism is adapted to be secured to the ordinary filling tube 3 and comprises the following described parts: 4 designates the valve casing having at its lower end an annular flange 5 on which rests a gasket 6, which is mounted in an inner annular groove 7 provided in the upper end of an internally threaded coupling 8, which is fitted on the upper end of the tube 3 and which bears against a nut 9 mounted on the tube 3 and bearing against the rim 2. The lower end of the casing 4 bears against a gasket 10 which rests upon the upper end of the tube 3. Lengthwise through the valve casing 4 is an air inlet passage 11, the lower end of which communicates with the interior of the tube 3 by way of a lateral opening 13 provided in a vertical tube 12 which is secured in the lower end of the passage 11. Secured in the tube 12 is a block 14 having vertical peripheral grooves 15, which permits the air to pass from the tube 3 into the passage 11. The blocks 14 is adapted when the valve mechanism is in operative position, to depress the usual valve stem 16, with which the tube 3 is commonly provided. The upper end of the passage 11 is adapted to communicate with the atmosphere to permit the escape thereto of air from the tire 1. The upper end of the casing 4 has a tubular extension 17, which is internally screw-threaded and has fitted therein a collar 18 which bears against a valve seat member 19, which is mounted in and extends through a rubber gasket 20, which is mounted in the lower end of the threaded portion 17. An inwardly opening valve 21 mounted in the passage 11 below the valve seat 19 is normally held against said valve seat by means of a coil spring 23 which encircles a stem 24 extending downwardly from the valve 21 and through a hole in the upper end of an inverted cup-shaped support 25, the lower end of which rests against an annular shoulder 26 provided in the passage 11. The support 25 is loosely fitted in the passage 11 and has longitudinal slots 27 which serve as air passages. The valve 21 is provided with an upwardly extending stem 22, which extends through the valve seat 19 and the collar 18, and projects above the upper end of the extension 17 and is adapted to have bear against it one end of a horizontal lever 30, which is pivoted adjacent to its middle on a horizontal pin 29 which is secured in an ear 28 with which the upper end of the extension 17 is provided. The other end of the lever 30 is adapted to be raised, for the purpose of depressing the valve 21, by means of a vertically movable plunger which I will hereinafter describe.

The casing 4 is provided with a circular screw-threaded recess 31, in which is fitted a vertical hollow cylinder 32, which rests upon the upper side of a flexible diaphragm 33, preferably soft rubber, which is larger than and closes the upper end of the tube 12. Reciprocatively mounted in the cylinder 32 is a piston 34 adapted to be raised by the diaphragm 33 and having in its upper end a central screw-threaded hole in which is fitted the screw-threaded lower end of a plunger rod 35. The piston 34 is slidably mounted in an externally screw-threaded collar 36 which is fitted in the recess 31 and bears against the upper end of the cylinder 32. The upper end of the stem 35 is screw-threaded and has mounted on it a lock nut 37 which bears against a nut 38, which is adapted to strike and lift the adjacent end of the lever 30 so as to depress and open the valve 21. By adjusting the nuts 37 and 38 vertically on the stem 35, the valve 21 may be opened at different degrees of pressure of the air in the passage 11 and tire 1. A coil spring 39 has its upper end bearing against an externally threaded collar 40, which is vertically adjustably fitted in the screw-threaded upper end of the casing 4. The spring 39 encircles the stem 35 and bears at its lower end against a rack 41 consisting of a collar fitted on the stem 35 and provided with annular peripheral flanges 42 spaced equal distances apart and serving as teeth which engage with the teeth of a segmental gear 43, Figs. 3 and 4, which is secured to a horizontal tubular shaft 44, which is pivotally mounted on a horizontal pin 45, one end of which is rigidly secured to a vertical plate 46, which is circular and fitted in an annular recess 47 provided in one side of the casing 4. Secured to the rock-shaft 44 is a segmental gear 48, which meshes with a pinion 49, which is secured to a horizontal rock shaft 50 rotatably mounted in a bearing 51 which extends through a central hole in the plate 46. To the outer end of the shaft 50 is secured a hand or pointer 52 adapted to designate numerals which may be provided on the outer face of the plate 46, said numerals denoting pounds pressure of the air in the tire 1. The plate 46 thus also effects the function of a dial.

For covering the dial and holding it in place, a tube 53 is fitted in the recess 47 and bears in its inner end against the outer face of the dial plate 46. Against the outer end of the collar 53 bears a transparent plate 54, which is held in place by a spring ring 55 which is mounted in an annular groove provided in the outer end of the recess 47.

A closure 56, pivoted to the casing 4 by a horizontal pin 57, Fig. 2, below the recess 47, is adapted to be swung from the closed position shown in Figs. 1 and 3, to the open position shown in Fig. 2.

When the pressure in the tire 1 and passage 11 rises, the diaphragm 33 will rise against the pressure of the spring 39 and will depress the valve 21 through the intermediacy of the stem 22, lever 30, nut 38, stem 35 and piston 34, thereby permitting air to escape from the tire so as to prevent its being burst by undue internal pressure. When the tire pressure lowers, the plunger, comprising the piston 34, stem 35 and nut 38 will be lowered by the spring 39, thereby permitting the valve 21 to close.

For the purpose of permitting the tire to be pumped up, without at all interfering with the operation of the valve mechanism already described, the valve casing 4 is provided with an air passage 58 which communicates, below the valve 21 with passage 11, and which extends upwardly therefrom through a vertical tubular extension 59 with which the upper end of the casing 4 is provided. The upper end of the extension 59 is internally and externally screw-threaded and has fitted therein an externally threaded collar 60, the lower end of which bears against a valve seat member 61, which is supported by and extends through a gasket 62, which is supported by an annular shoulder 63 in the lower threaded portion of the extension 59.

An inwardly opening valve 64 in the passage 58 is adapted to bear against the valve seat member 61, and is normally held against said member by a coil spring 65, which encircles a downwardly extending stem 66 of the valve 64. The lower end of the spring 65 bears against an inverted cup shaped member 67, which is supported by a shoulder 68 in the passage 58, below the valve 64. The member 67 is provided with longitudinal slots 69, which serve as air passages, the member 67 being loosely fitted in the passage 58. The lower end of the stem 66 is slidably mounted in a central hole in the top of the member 67. The valve 64 is provided with an upwardly extending stem 70 which extends through the valve seat member 61 and collar 60.

In filling the tire, the usual coupling, not shown, with which the pump is commonly provided, is inserted in the extension 59, thereby depressing the valve stem 70 and valve 64, following which the filling operation is effected in the usual manner, the entering air passing through the passage 58 into the passage 11, and thence into the tire. In case the pressure rises in the tire beyond the predetermined limit for which the valve 21 is arranged to be opened by the other valve operating mechanism already described, the plunger having the nut 38 will be lifted to a position in which the nut will swing the lever 30 so as to open the valve 21, thereby preventing the tire being burst while being filled.

The upper end of the extension 59 is adapted to discharge into a cap 71 having an outlet 72 communicating with the atmosphere, and provided with an internally screw threaded lower end detachably fitted to the externally screw threaded upper end of the casing 4.

When the diaphragm 33 rises, the piston 34 will lift the rack collar 41, thereby turning the hand or pointer 52, through the intermediacy of the segmental gear 43, tubular shaft 44, segmental gear 48, pinion 49 and shaft 50.

By adjusting the nuts 37 and 38, the device may be arranged to open the valve 21 at any desired pressure, the pressure of the spring 39 being adjustable by vertical adjustment of the collar 40.

I do not limit my invention to the structure shown and described, as modifications, within the scope of the appended claims, may be made without departing from the spirit of my invention.

Having thus described my invention, what I claim and desire to secure by Letters Patent, is:—

1. In a valve mechanism, a valve casing having an air passage, a valve normally closing said passage, a lever for opening said valve, a member movable in one direction by the pressure in said passage, and when moved a pre-determined distance, engaging said lever for opening said valve, and yielding means for resisting movement of the member in said direction.

2. In a valve mechanism, a valve casing having an air passage, a valve normally closing said passage, a lever for opening said valve, and means actuated by a pre-determined pressure in said passage for swinging said lever to open said valve.

3. In a valve mechanism, a valve casing having an air passage, a valve normally closing said passage, a lever for opening said valve, and adjustable means actuated by a pre-determined pressure in said passage for swinging said lever to open said valve.

4. In a valve mechanism, a valve casing having an air passage, a valve normally closing said passage, means adjustable as to length and movable longitudinally in one direction by a pressure in said passage, yielding means for resisting movement in said direction of said longitudinally movable means, and a lever in the path of said longitudinally movable means and movable thereby so as to open said valve.

5. In a valve mechanism, a valve casing having an air passage, a valve normally closing said passage, a plunger movable in one direction by the pressure in said passage, yielding means for resisting movement of the plunger in said direction, means actuated by the plunger for opening said valve, and means actuated by said plunger for indicating the pressure in said passage.

6. In a valve mechanism, a valve casing having an air passage, a valve normally closing said passage, a lever for opening said valve, means actuated by the pressure in said passage for swinging said lever to open said valve, and means actuated by said lever swinging means for indicating the pressure in said passage.

7. In a valve mechanism, a valve casing having an air passage, a valve normally closing said passage, a dial, a pointer coöperating with said dial, and means actuated by the pressure in said passage for operating said pointer and for opening said valve.

8. In a valve mechanism, a valve casing having an air passage, a valve normally closing said passage, a plunger movable in one direction by the pressure in said passage, yielding means for resisting movement of said plunger in said direction, means actuated by the plunger when it has moved in said direction a pre-determined distance for opening said valve, a dial, indicating means coöperating with said dial, and means actuated by the plunger for operating said indicating means.

9. In a valve mechanism, a valve casing having an air passage, a valve normally closing said passage, a lever for opening said valve, a plunger including two members longitudinally adjustable relative to each other and movable by the pressure in said passage, and adapted to swing said lever to open said valve when moved a pre-determined distance, and yielding means for resisting movement of said plunger.

10. In a valve mechanism, a valve casing having an air passage, a valve normally closing said passage, a plunger including two members having screw-threaded connection with each other and movable in one direction by a pressure in said passage, a lever for opening said valve and actuated by said plunger, and yielding means for resisting movement of the plunger in said direction.

11. In a valve mechanism, a valve casing having an air passage, a plunger movable in one direction by the pressure in said passage, yielding means for resisting movement of the plunger in said direction, a valve normally closing said passage, means actuated by the plunger for opening said valve, a pivoted member, a dial, an indicator coöperating with said dial, means actuated by the plunger for swinging said pivoted member, and means actuated by said pivoted member for operating said indicator.

12. In a valve mechanism, a valve casing having an air passage, a plunger movable in one direction by the pressure in said passage, yielding means for resisting movement of the plunger in said direction, a valve normally closing said passage, a rack carried by said plunger, pivoted means including a gear engaging said rack, pressure indicating means actuated by said pivoted means, and means actuated by the plunger for opening said valve.

13. In a valve mechanism, a valve casing having an air passage, a valve normally closing said passage, a plunger movable in one direction by the pressure in said passage, yielding means for resisting movement of the plunger in said direction, a pivoted member, a rack carried by said plunger, a gear engaging said rack and carried by said pivoted member, a dial, an indicator coöperating with said dial, means actuated by said plunger for opening said valve, and means actuated by said pivoted member for operating said indicator.

14. In a valve mechanism, a valve casing having an air passage, a plunger movable in one direction by the pressure in said passage, a rack carried by said plunger and comprising a member rotatable on said plunger and provided with peripheral flanges forming rack teeth, a pointer, a pivoted member, a gear secured to said pivoted member and meshing with said rack, and means actuated by said pivoted member for revolving said pointer.

In testimony whereof I have signed my name to this specification in presence of two subscribing witnesses.

WILLIAM M. MYERS.

Witnesses:
WARREN D. HOUSE,
E. B. HOUSE.